United States Patent [19]
George

[11] Patent Number: 5,508,593
[45] Date of Patent: Apr. 16, 1996

[54] DIFFERENTIAL ERROR CONVERGENCE CORRECTION

[75] Inventor: John B. George, Carmel, Ind.

[73] Assignee: Thomson Consumer Electronics, Inc., Indianapolis, Ind.

[21] Appl. No.: 241,023

[22] Filed: May 11, 1994

[51] Int. Cl.$^6$ .................................................. H01J 29/56
[52] U.S. Cl. ...................... 315/371; 348/746; 315/368.18
[58] Field of Search ........................... 315/371, 368.18; 348/746

[56] References Cited

U.S. PATENT DOCUMENTS

| | | | |
|---|---|---|---|
| 2,880,358 | 3/1959 | Parker | 315/13 |
| 4,395,662 | 7/1983 | Sexton, Jr. | 315/371 |
| 4,563,618 | 1/1986 | Haferl | 315/370 |
| 4,766,354 | 8/1988 | Oliver | 315/371 |
| 4,810,939 | 3/1989 | Watanabe et al. | 315/371 |

OTHER PUBLICATIONS

John B. George, *Convergence Correction*, U.S. application file wrapper continuation, 08/493,595, filed Jun. 22, 1995.

*Primary Examiner*—Theodore M. Blum
*Attorney, Agent, or Firm*—Joseph S. Tripoli; Joseph J. Laks; Harvey D. Fried

[57] ABSTRACT

A convergence correction circuit, for a cathode ray tube projecting images having keystone, differential sine and differential left edge curl distortions, comprises generators for horizontal rate sine, horizontal rate sawtooth and horizontal rate pulse waveforms. A summer combines the horizontal rate waveforms into a horizontal rate composite waveform. A multiplier and an amplifier generate as an output signal a product of the horizontal rate composite waveform and a vertical rate sawtooth waveform. A convergence correction coil is coupled for receiving the output signal and generating a dynamic magnetic field correcting the keystone, differential sine and differential left edge curl distortions.

24 Claims, 6 Drawing Sheets

DIFFERENTIAL ERROR CONVERGENCE CORRECTION

This invention relates generally to the field of convergence correction.

Figure 4:
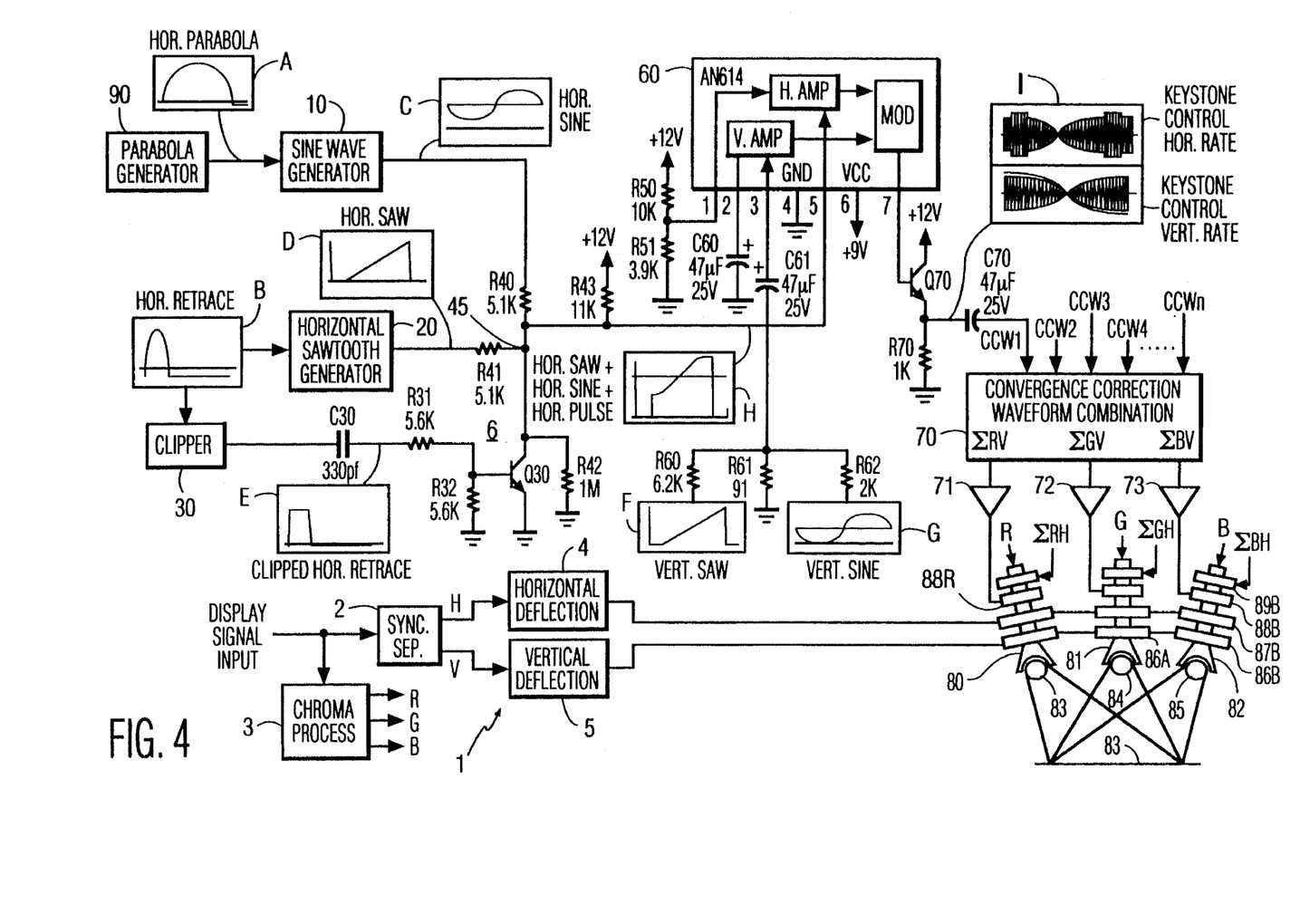
FIG. 4 is a diagram, in block and schematic form, of a projection television receiver, including a circuit for correcting keystone distortion, differential sine distortion of red and blue in the horizontal lines and differential left edge curl distortion of horizontal lines.

Projection television receivers are subject to numerous picture distortions because all three projection cathode ray tubes (CRT's) used in such receivers are off axis with respect to one another and two of the three projection CRT's are off axis with respect to a flat screen, as shown diagrammatically, for example, in the lower right hand corner of FIG. 4. Dynamic convergence correction requires that numerous convergence correction signals be generated and applied to a set of auxiliary convergence correction coils in the horizontal and vertical deflection yokes of each CRT.

Figure 1:
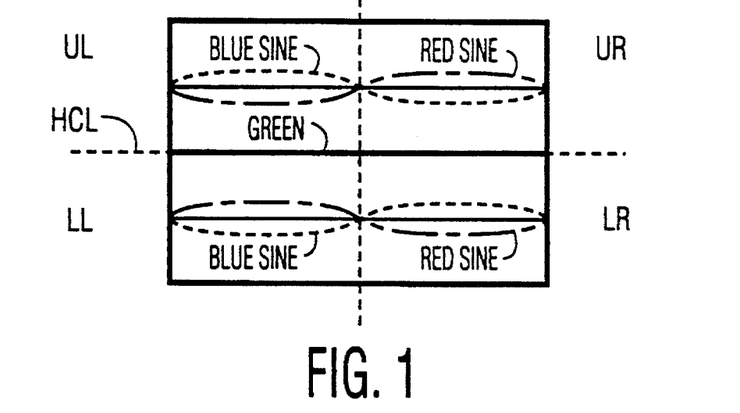
FIG. 1 is a diagram useful for explaining differential sine distortion of red and blue in the horizontal lines.

In projection television receivers using curved face plate cathode CRT's, which have a concave face plate curvature, a differential sine shaped distortion related to the keystone distortion of the red and blue images has been identified. With reference to FIG. 1, this distortion causes the blue horizontal lines (dotted in FIG. 1) of an otherwise converged picture to be above the green and red lines in the upper left (UL) and lower right (LR) quadrants of the picture and to be below the green and red lines in the upper right (UR) and lower left (LL) quadrants of the picture. Similarly, red horizontal lines (dash-dotted in FIG. 1) of an otherwise converged picture are above the green and blue lines in the upper right (UR) and lower left (LL) quadrants of the picture and are below the green and blue lines in the lower right (LR) and upper left (UL) quadrants of the picture. This distortion is zero amplitude at the horizontal centerline (HCL) and increases in amplitude toward the top and bottom of the picture. It can be seen that this distortion is generally sinusoidal.

Figure 2:
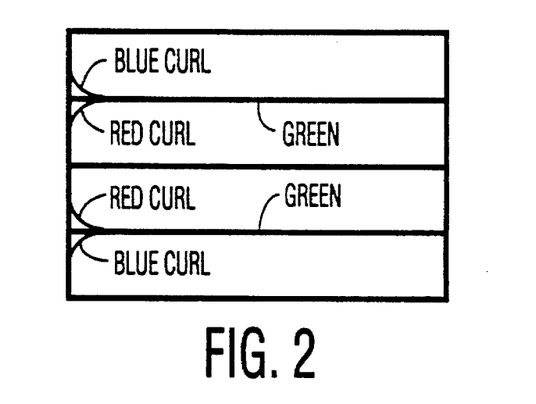
FIG. 2 is a diagram useful for explaining differential left edge curl distortion of horizontal lines.

A second distortion causes the red and blue horizontal lines to curl differentially up and down at the left edge of the picture, as shown in FIG. 2. This distortion has been found to be due to slow response time in the convergence power amplifiers.

Figure 3:
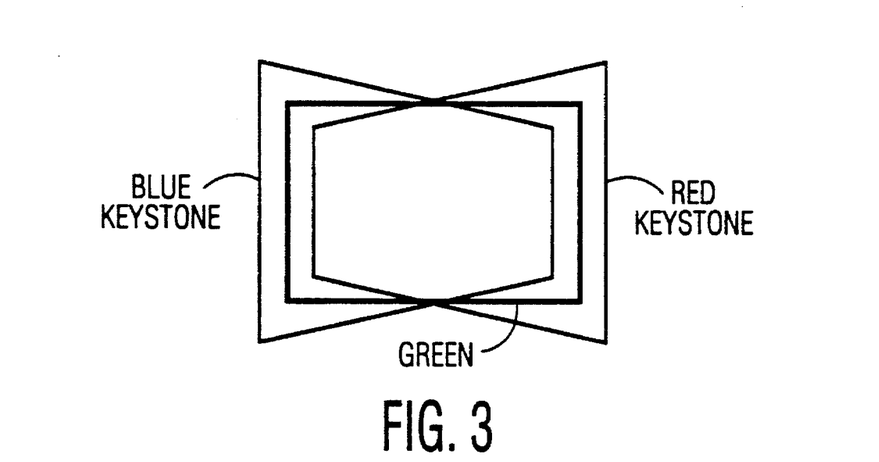
FIG. 3 is a diagram useful for explaining keystone distortion.
Figure 6:
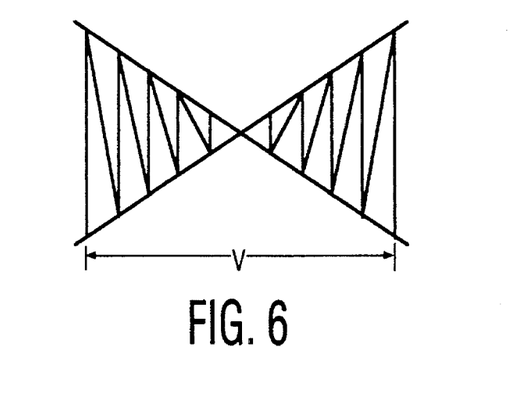
FIG. 6 is a diagram useful for explaining waveforms used for correction of keystone distortion.

A third distortion common to all projection television receivers is keystone distortion, as shown in FIG. 3. Since the green CRT optical axis is orthogonal to the screen surface at the screen center, there is very little keystone distortion in the green picture. Similarly, since the red and blue CRT optical axes are in the plane that includes the screen horizontal centerline and is perpendicular to the screen surface there is very little vertical keystone distortion of red and blue. However, the red and blue CRTs are offset from the screen center horizontally and tilted inward. The red and blue CRTs are located on either side of the green CRT. This arrangement causes s equal and opposite horizontal keystone distortions of red and blue. The red and blue pictures have parallel left and right edges and oppositely diverging top and bottom edges. Keystone distortion has been corrected by a signal which represents the product of a horizontal rate sawtooth and a vertical rate sawtooth. Such a signal is also referred to by the nomenclature "horizontal saw X vertical saw". Other convergence correction waveforms are also referred to in similar nomenclature as the product of other signals. The product is a vertical rate "bow tie" shaped output signal, as shown in FIG. 6, where the horizontal rate sawtooth has a maximum amplitude at the top and bottom of the picture and zero amplitude at the horizontal centerline. The horizontal phase reverses at the horizontal centerline. Accordingly, the keystone distortion correction waveforms for red and blue must be of opposite polarity and are mainly applied to the red and blue vertical convergence correction coils.

The correction of particular convergence errors, or distortions, can often interfere with the correction of other convergence errors due to the many convergence correction signals which are applied to the convergence correction coils of the horizontal and vertical deflection yokes. The problems raised by the differential sine and left edge curl distortions are firstly, the correction of such distortions, and secondly, the correction of such distortions without interfering with other convergence corrections.

The differential sine distortion of red and blue in the horizontal lines is sine shaped. Accordingly, a horizontal rate sine correction multiplied by a vertical saw can be used to correct it. It has been determined that the differential sine distortion of red and blue can be corrected by adding a horizontal sine signal to the same horizontal saw signal used for generating the keystone distortion correction signal before that horizontal saw signal is multiplied by the vertical saw signal to produce the keystone distortion correction signal. The sine phase is chosen so that the top and bottom peaks of the horizontal saw appear limited and the zero crossing has an increased slope.

It has also been determined that the left edge differential curl can be corrected by developing an overdrive pulse during horizontal retrace, and adding that overdrive pulse to the horizontal sine signal and to the horizontal saw signal, also before multiplication with the vertical saw signal, to speed up the amplifier response.

A correction circuit for a cathode ray tube displaying images subject to distortion comprises: means for generating a horizontal rate sawtooth waveform; means for generating a horizontal rate sine waveform; means for generating a horizontal rate pulse waveform; means for summing the horizontal rate sawtooth, sine and pulse waveforms to define a horizontal rate composite waveform; means for generating as an output signal a product of the horizontal rate composite waveform and a vertical rate waveform, the horizontal rate composite waveform being DC coupled to the product generating means; means for amplifying the output signal; and, a correction coil for the cathode ray tube coupled for receiving the amplified output signal and generating a dynamic magnetic field responsive to the output signal, the output signal having a first component for correcting a keystone distortion, a second component for correcting a red/blue differential sine distortion and a third component for correcting a red/blue differential left edge curl distortion.

The keystone distortion is due to off-axis orientation of the cathode ray tube, the red/blue differential sine distortion is due to face plate geometry of the cathode ray tube and the red/blue differential left edge curl distortion is imparted by operation of the amplifying means.

A projection television receiver is shown in block and schematic form in FIG. 4 and generally designated by reference numeral 1. The receiver comprises a synchronizing signal separator 2 and a chrominance processor 3, each responsive to a display signal input. Horizontal synchronizing components H and vertical synchronizing components V are supplied to horizontal and vertical deflection circuits 4 and 5, respectively. Three projection CRT's 80, 81 and 82 are provided for red R, green G and blue B signals respectively, as generated by the chrominance processor 3. Each CRT displays a monochrome image corresponding to its color onto screen 83, using a lens 84. Only the green CRT 81 is orthogonal with the screen 83. The red and blue CRTs are located on either side of the green CRT, offset from the screen center horizontally and tilted inward. This arrangement causes equal and opposite horizontal keystone distortions of red and blue as described above. The red and blue pictures have parallel left and right edges and oppositely diverging top and bottom edges.

Each CRT is provided with deflection yokes. Each horizontal deflection yoke includes a main vertical deflection coil 86, a main horizontal deflection coil 87, an auxiliary vertical deflection coil 88 for vertical convergence correction and an auxiliary horizontal deflection coil 89 for horizontal convergence correction. The various coils of the respective CRT's are distinguished as necessary by the suffixes R, G and B for red, green and blue respectively. A system for generating a plurality of waveforms for convergence correction is generally designated by reference numeral 6.

Convergence correction system 6 receives and/or generates a plurality of different waveforms which are scaled, added and/or multiplied in a wide variety of combinations to provide six composite convergence correction waveforms, representing corrections for red horizontal (ΣRH), red vertical (ΣRV), green horizontal (ΣGH), green vertical (ΣGV), blue horizontal (ΣBH) and blue vertical (ΣBV). The ΣRV output signal is coupled to the convergence correction coil 88R through output amplifier 71. The ΣGV and ΣBV output signals are coupled to their respective convergence correction coils through output amplifiers 72 and 73 respectively.

A circuit for generating only one such convergence correction waveform, designated waveform I, is shown in detail in FIG. 4. Waveform I is a first convergence correction waveform CCW1 input to a convergence correction waveform combination circuit 70. Waveform CCW1 (I) is the product of a waveform multiplication. The output signal of the multiplier is buffered by transistor Q70 and AC coupled to the convergence correction waveform combination circuit 70 through capacitor C70. Other convergence correction waveforms are inputs CCW2 through CCWn. Forty or more such convergence correction waveforms may be required.

Waveform I represents the product of two signals. One signal is generally a vertical rate saw, shown as waveform F. The vertical saw F has a peak to peak voltage of 4.25 volts and a DC level of 5.3 volts. A small amount of size correction is done in the vertical direction by adding a small amplitude vertical rate sine, shown as waveform G, to the vertical saw F. The vertical sine G has a peak to peak voltage of 0.2 volts and a DC level of 0.1 volts. Vertical saw F and vertical sine G are summed in a resistive summing network formed by resistors R60, R61 and R62. This corrects the gain of the horizontal correction at the top and bottom of the picture. The other signal is waveform H, which is itself the sum of waveforms C, D and E.

Figure 5:
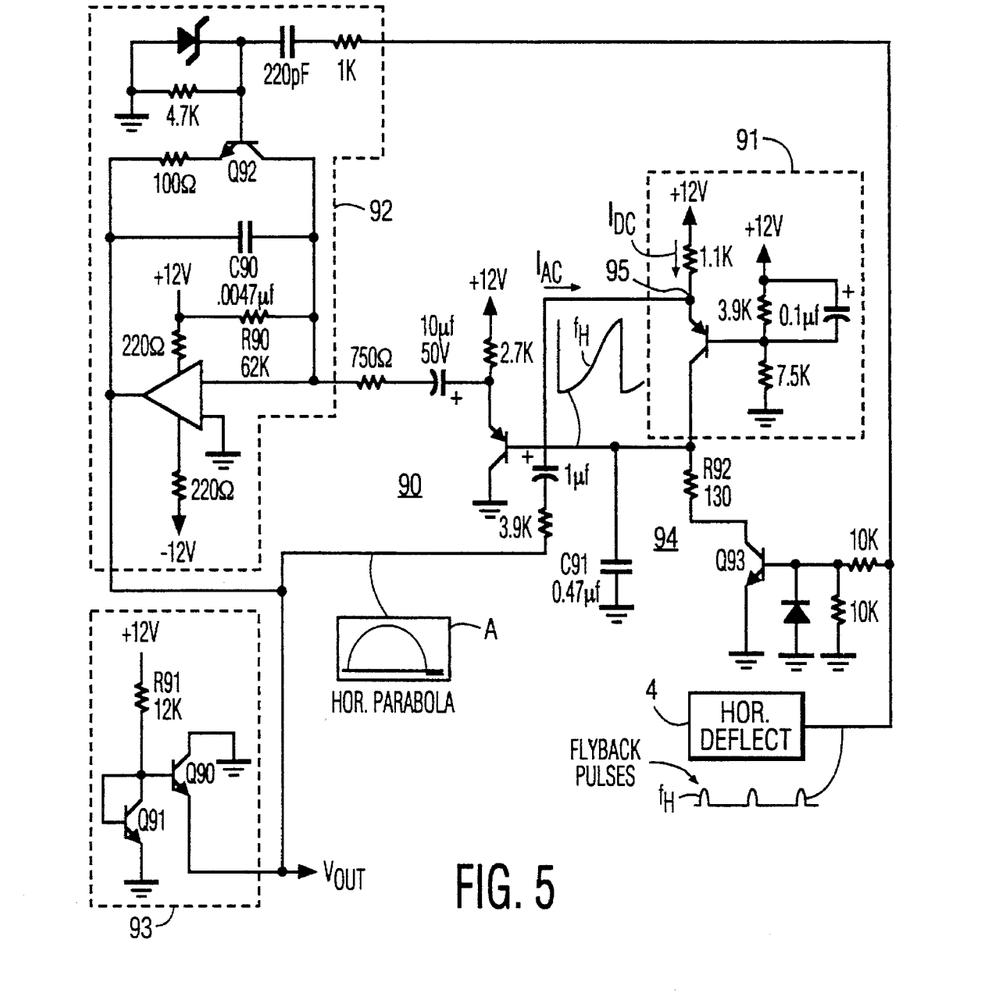
FIG. 5 is a schematic diagram of the parabola generator shown in FIG. 4.

The generation of waveform H begins with a horizontal rate parabola designated waveform A that is supplied to a sine wave generator 10, which develops the generally sinusoidal wave designated waveform C. The horizontal rate parabola has a positive peak voltage of +5.6 volts and a negative peak voltage of −0.1 volts. Moreover, the horizontal rate parabola leads the main scan by the delay in the convergence power amplifier, which is about 5 μsec. It is also necessary to shape the parabola to achieve straight horizontal lines in the picture. Such a horizontal rate parabola can be generated by the circuit 90 shown in FIG. 5. With reference to FIG. 5, a constant current $I_{DC}$ is generated by source 91. A variable feedback current $I_{AC}$ is summed with current $I_{DC}$ at junction 95. The composite current charges capacitor C91. Capacitor C91 is periodically discharged by reset circuit 94, by horizontal retrace pulses from horizontal deflection circuit 4, which turn transistor Q93 on a the horizontal rate. The result is a horizontal rate sawtooth signal as shown, which is AC coupled to integrator 92. Integrator 92 includes an operational amplifier U1 having an integrating capacitor C90 and a DC biasing circuit including R90. The output parabola waveform A is AC coupled to junction 95 as the variable current $I_{AC}$. A clamp circuit 93 coupled to the output of integrator 92 includes transistors Q90 and Q91 and resistor R91.

The horizontal reset pulses are AC coupled so that only its rising edge resets the horizontal parabola. This allows integration to start about 5 μsec ahead of the end of the horizontal reset pulses. The DC current bias supplied by resistor R90 to the inverting input of U1 is used at the input to the integrator to tilt the horizontal parabola so that the peak occurs about 5 μsec before the center of horizontal scan. Normally, after peak, the parabola continues in a negative direction until the retrace pulse occurs and resets the output back to zero. However, a negative going overshoot results when the DC bias tilts the horizontal parabola and the useful part of the horizontal parabola ends about 5 μsec before the horizontal reset pules start. This causes horizontal lines to flair at the right edge of the picture. The clamp 93 clips the negative going parabola at about −100 mV. This was determined to be the best level for achieving straight horizontal lines at the right edge of the picture. This level can be critical and is maintained by the clamp 93 even as temperature changes occur. Transistor Q91 receives a nearly constant current at its collector of about 1 mA. A small fraction of this current, determined by the DC beta of transistor Q91, flows into the base of transistor Q90 and determines the base to emitter voltage which is forced by feedback to also be the collector to emitter voltage. The current that flows in transistor Q90 during clamping is about 10 mA. Transistors Q90 and Q91 are of the same type operating in a similar ambient temperature. The higher collector current in transistor Q90 causes a larger base to emitter voltage than in transistor Q91, such that the difference, about 100 mV, tends to stay constant with temperature changes.

Integration of the horizontal parabola is reset by the discharge of the integration capacitor C90 by transistor Q92 during the first half of the horizontal reset pulses and is allowed to start during the second half of the horizontal reset pulses. The function being integrated during this time is a negative going capacitance discharge is due to the effect of resistor R92 and transistor Q93 on the voltage of capacitor C91. This causes an increasing positive slope in the horizontal parabola during the first 5 µsec of integration instead of the decreasing positive slope that is characteristic of a parabola. This flaring of the horizontal parabola helps straighten the horizontal lines at the left edge of the picture.

Figure 7:
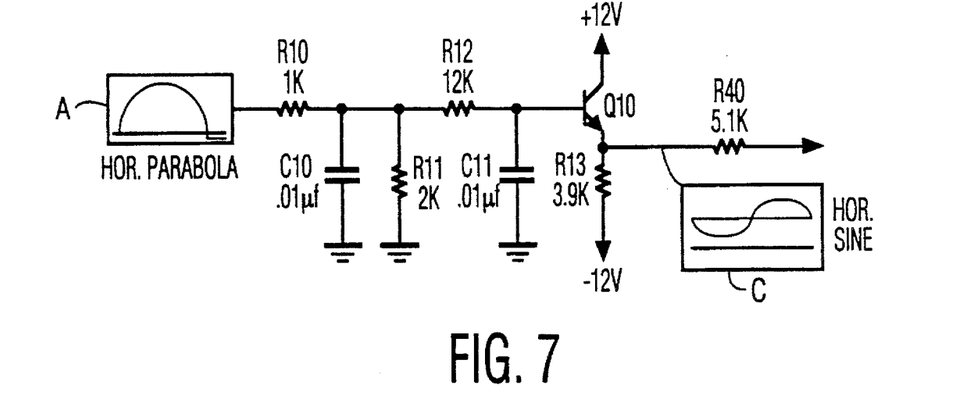
FIG. 7 is a schematic diagram of the sine wave generator shown in FIG. 4.

Referring back to FIG. 4, the horizontal parabola waveform A is low pass filtered and phase shifted in sine wave generator 10 to produce the waveform C, shown as a horizontal sine with a positive going zero crossing about 5 µsec before horizontal mid scan, a DC average value of 1.35 volts and a 1.6 volts peak to peak amplitude. A circuit schematic for the sine wave generator 10 is shown in FIG. 7. The horizontal parabola is low pass filtered by a network including resistors R10, R11 and R12 and capacitors C10 and C11. The filtered signal is buffered by transistor Q10, which is emitter biased by resistor R13.

Referring back to FIG. 4, a horizontal sawtooth generator 20 produces the horizontal sawtooth signal as shown in waveform D. Horizontal sawtooth generator 20 is shown in more detail in FIG. 8. A current source charges a capacitor C20. The capacitor C20 is rapidly discharged at the beginning of the 10 µsec horizontal retrace pulses by conduction of transistor Q20. The horizontal retrace pulses are 22 volts peak to peak, having a positive peak of +18 volts and a negative peak of −4 volts, as shown by waveform B. The resulting waveform D is 0 volts for 10 µsec during horizontal retrace and increases to a peak amplitude of 3.6 volts during trace. The DC average is about 1.5 volts.

Figure 8:
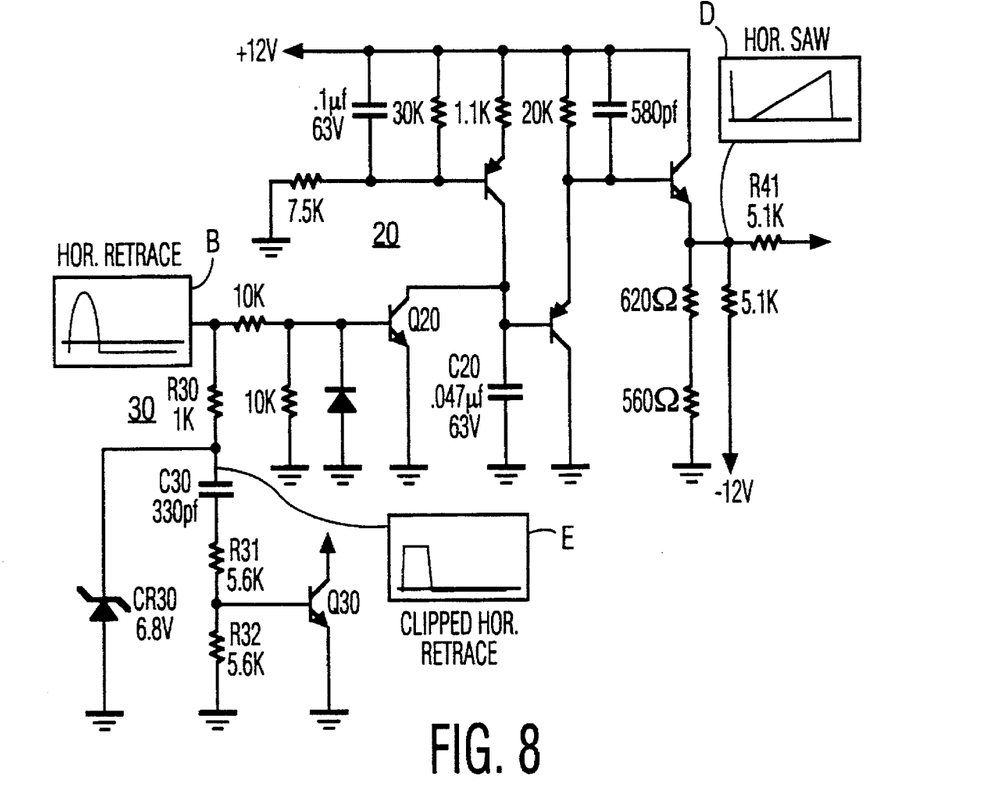
FIG. 8 is a schematic diagram of the horizontal sawtooth generator and the clipper, each shown in FIG. 4.

A voltage divider is formed by resistors R43 and R42, coupled in series between +12 volts and ground. The junction of resistors R43 and R42 forms a resistive summing junction 45 for the horizontal sine C and the horizontal sawtooth D, which are coupled to the summing junction 45 by resistors R40 and R41 respectively.

The summing junction 45 is DC coupled to the differential input pin 5 input of a signal multiplier 60, for example a Panasonic AN614 multiplier. The opposing differential input, pin 1, is biased by a voltage divider formed by resistors R50 and R51 coupled in series between +12 V and ground. The resulting bias level is about 3.4 volts, is which is equal to the DC value of the sum of the horizontal saw and horizontal sine about 5 µsec before horizontal mid scan. Since both sides of the differential input are referenced equally to the +12 V supply, any variations of this supply cancel. Such DC coupling is an unconventional bias arrangement for multipliers like the AN614, which are usually AC coupled to the signal sources being multiplied. For example, the summed signal representing the combination of waveforms F and G is AC coupled to pin 4 of multiplier 60 through capacitor C61.

The DC coupling is used to solve another problem, namely the differential left edge curl. The solution entails the addition of a pulse signal during horizontal retrace that speeds the response time of the convergence output amplifier and straightens the red and blue differential curl at the left edge of the picture. If AC coupling is used, this retrace pulse addition distorts the response during trace time. This occurs because the composite waveform has a new DC average and a shift occurs that moves the balance point of the differential amplifier away from the desired time during trace. DC coupling slows addition of the pulse during retrace without disturbance of the amplifier balance during trace. Additionally, it was discovered that with DC coupling a very large pulse could be used during retrace, but that the peak of the output would be controlled by the amplifier internal design. This means that power amplifier response can be adjusted with pulse duration rather than amplitude.

Adjustment of the power amplifier by pulse duration can be accomplished with transistor Q30. The horizontal retrace pulses according to waveform B, at 22 volts peak to peak, are also an input to a clipper circuit 30. As shown in FIG. 8, the clipper circuit 30 comprises resistor R30 and Zener diode CR30. The Zener diode CR30 is rated at 6.8 volts. The output of the clipper circuit 30 is a clipped horizontal retrace pulse having a positive peak of 6.8 volts and a negative peak of −0.6 volts. The clipped retrace pulses, at a level of 7.4 volts peak to peak are AC coupled to the base of transistor Q30 through capacitor C30, and through a voltage divider formed by resistors R31 and R32. Transistor Q30 turns on at the rising edge of this clipped horizontal retrace pulse and turns off at a time determined by capacitor C30 and resistor R31. The collector of transistor 30 is also coupled to the summing junction 45, and added to the horizontal sine and the horizontal saw. The net result of the summation is shown in waveform H.

The effect of the pulses from transistor Q30 is best understood by reference to a schematic of the AN614, shown in FIG. 5. Pin 1 of the AN614 is the base of an NPN transistor Q64 that forms a Darlington circuit with transistor Q61. Pin 5 is the base of a second NPN transistor Q63 that forms a Darlington circuit with transistor Q60. Inside the AN614, the emitters of transistors Q60 and Q61 are connected together through series resistors R65 and R66, and share a current source of ground through transistor Q62 and resistor R68. The collector of transistor Q60 is connected to the emitters of transistors Q65 and Q66, which form another differential pair. The collector of transistor Q61 is also connected to the emitters of transistors Q67 and Q68, which also form another differential pair. The AN614 output is derived from the voltage across resistor R63 which is caused by the sum of collector currents from transistors Q65 and Q67. The bases of transistors Q65 and Q68, and of transistors Q66 and Q67, are connected to the differential input pins 2 and 3 respectively. When the voltage at pin 1 equals the voltage at pin 5, and the voltage at pin 2 equals the voltage at pin 3, the multiplier is in balance. Half the current from transistor Q62 flows in transistor Q60 and half flows in transistor Q61. One quarter of the current from transistor Q62 flows in each of transistors Q65, Q66, Q67 and Q68. The output resistor R63 receives half the current; a quarter from transistor Q65 and a quarter from transistor Q67. When the transistor pair Q60/Q61 is in balance, the transistor pairs Q65/Q66 and Q67/Q68 cannot change the output because any current lost when transistor Q65 is cut off flows in transistor Q67, and vice versa. The sum in resistor R63 is constant. When the transistor pair Q60/Q61 is not in balance, the maximum output is governed by the voltage difference between pins 2 and 3. The linear control range at pins 2 and 3 is about ±100 mV. If either transistor Q60 or transistor Q61 is cut off by pulling its base low, all the current from transistor Q62 flows in the other transistor. In this state, output amplitude is entirely controlled by the conditions at pins 2 and 3 because all the current can be steered either to output resistor R63 or to dummy output resistor R64.

In the present application the drive to pins 2 and 3 is set in the linear range below the clipping level so that the maximum current from transistor Q62 never flows in the output resistor R63. The resistors R65 and R66 supply feedback which extends the linear voltage control range at the pin 1 and pin 5 inputs. This range tends to be consistent from integrated circuit to integrated circuit because all the resistors are ratio matched. The absolute values vary about ±30%, but the ratio match is about ±5%. The value of resistor R68 sets the reference current. The input range provided by feedback from resistors R65 and R66 and the output range provided by resistor R63 are a function of this current. In the application, the linear drive to pin 5 is in the range ±0.8 volts, relative to 3.4 volts. The 3.4 volt center of the range corresponds to the 3.4 volt bias on pin 1. When pin 5 is 2.2 volts or less, transistors Q63 and Q60 cut off and the output is limited by the drive to pins 2 and 3 as explained above.

The ratio of the limited pulse amplitude to the linear drive amplitude can be adjusted by changing the linear drive amplitude. As an example, in order to increase the effect of the limited pulse by increasing its relative amplitude, the peak to peak linear drive to pin 5 is reduced by lowering the values of resistors R43 and R42, which form the voltage divider defining the summing junction 45. The resistance values are lowered such that the Thevenin equivalent resistance to 3.4 volts is reduced but the 3.4 volts is not changed.

Figure 9:
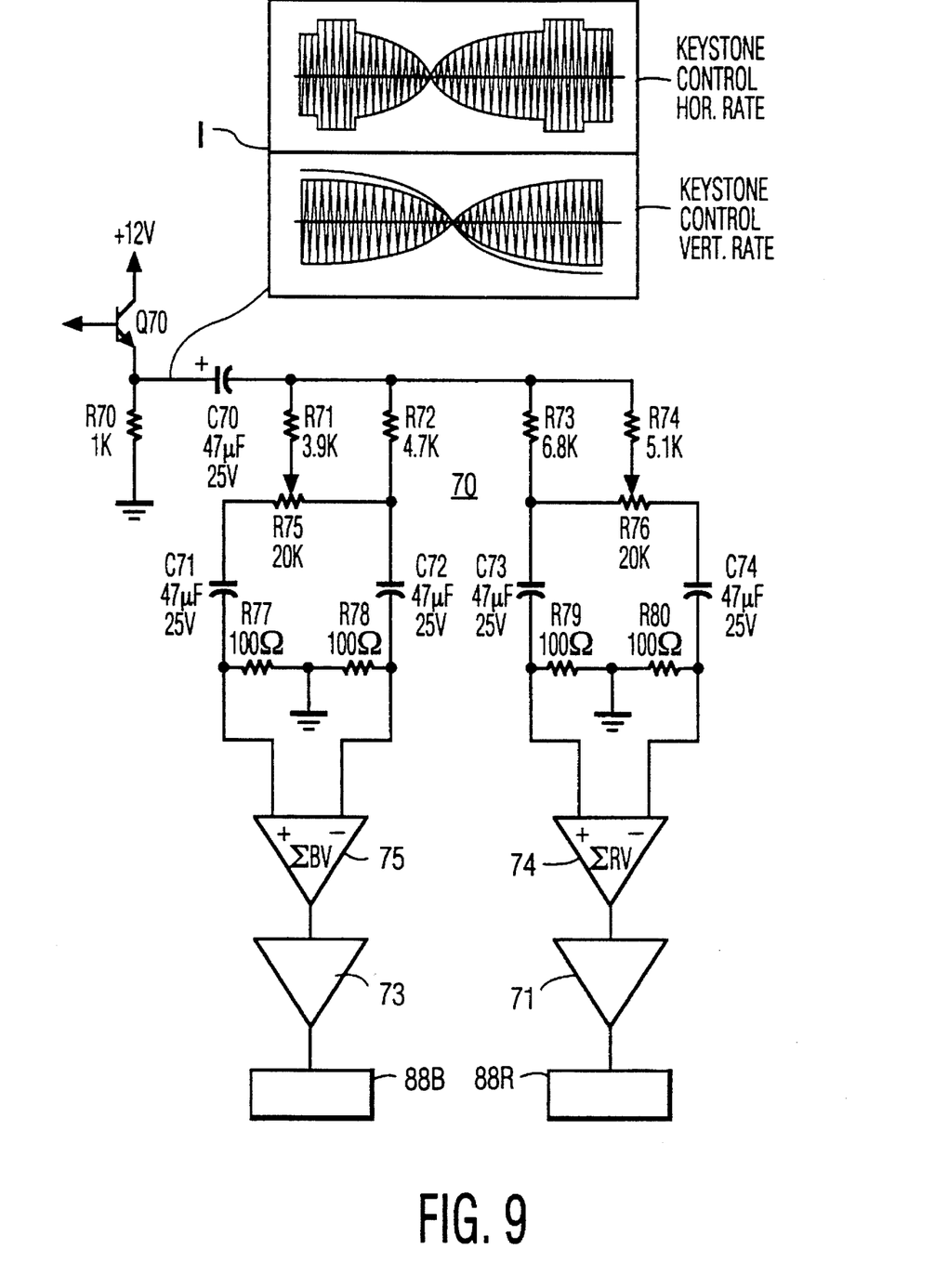
FIG. 9 is a schematic diagram of the convergence correction waveform output circuit shown in block form in FIG. 4.
Figure 10:
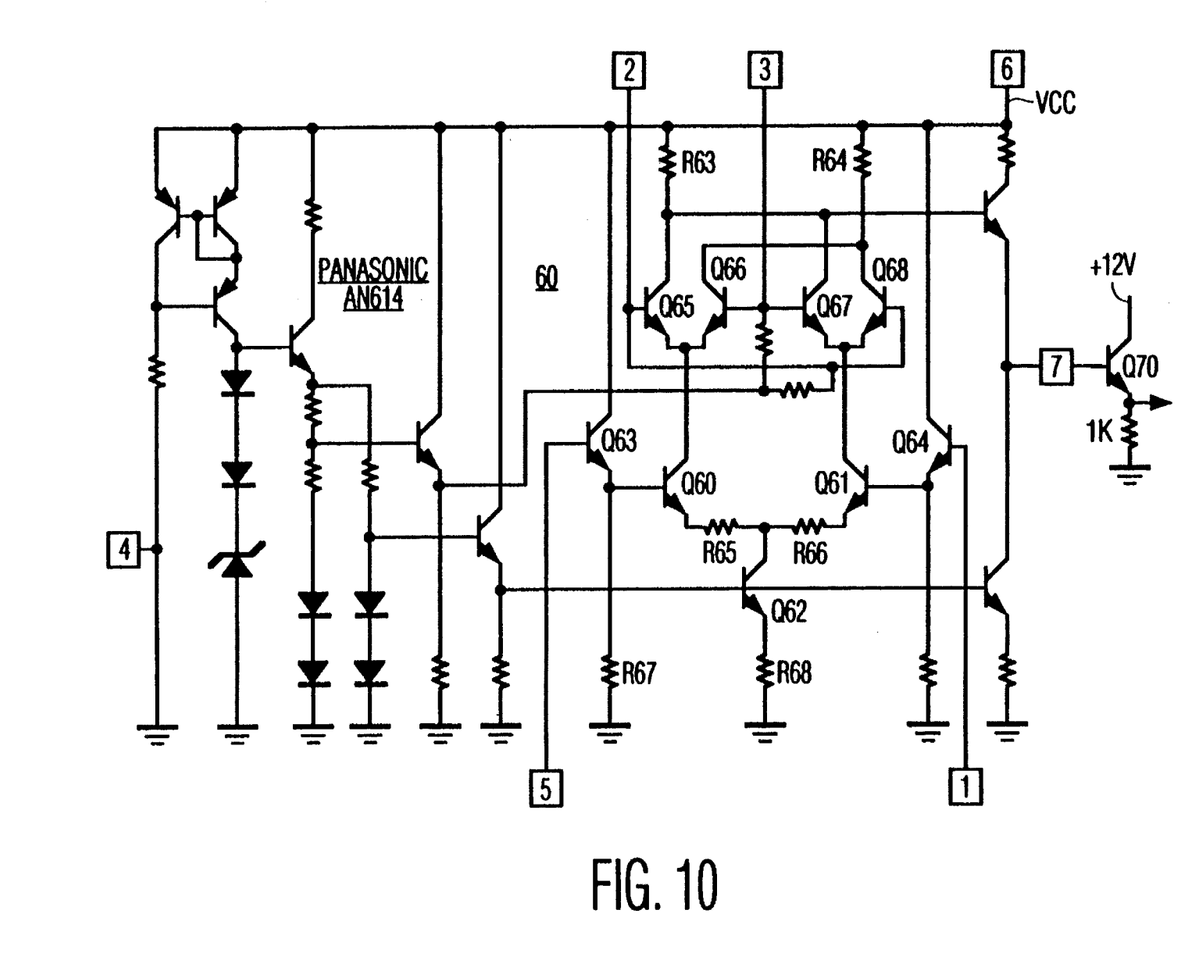
FIG. 10 is a schematic diagram of the AN614 integrated circuit, shown in block form in FIG. 4.

With reference to FIG. 9, additional gain can then be provided after the multiplier output by increasing the keystone gain by reducing the resistance of resistors R72 and R73 in the convergence correction waveform combination circuit 70. This restores the keystone correction to its previous value but the pulse has increased in amplitude. Resistors R72 and R73 are range centering resistors for keystone controls R75 and R76 respectively. Their values are chosen to roughly correct the keystone when the controls are centered. Resistors R71 and R74 adjust the control sensitivity and range.

Waveform I illustrates the keystone correction waveform at both the horizontal and vertical rates. In each case, the peak to peak voltage is 2.4 volts and the DC level is 8.37 volts. The effects of both the sine correction and the overdrive pulse are evident in the waveforms. Waveform I solves both problems raised by the differential sine and left edge curl distortions. Firstly, the differential sine and left edge curl distortions are corrected, and secondly, the correction of the differential sine and left edge curl distortions does not interfere with other convergence corrections. Moreover, the differential sine and left edge curl distortions can be corrected very efficiently by modifying the existing keystone distortion convergence correction waveforms.

What is claimed is:

1. A correction circuit for a cathode ray tube displaying images subject to distortion, said circuit comprising:

means for summing three horizontal rate waveforms to define a horizontal rate composite waveform;

means for generating as an output signal a product of said horizontal rate composite waveform and a vertical rate waveform, said horizontal rate composite waveform;

means for amplifying said output signal; and, a correction coil for said cathode ray tube coupled for receiving said amplified output signal and generating a dynamic magnetic field responsive to said output signal, said output signal having a first component for correcting a keystone distortion, a second component for correcting a red/blue sinusoidal distortion and a third component for correcting a red/blue left edge curl distortion.

2. The circuit of claim 1, wherein said keystone distortion is due to off-axis orientation of said cathode ray tube, said red/blue sinusoidal distortion is due to face plate geometry of said cathode ray tube and said red/blue left edge curl distortion is imparted by operation of said amplifying means.

3. The circuit of claim 1, wherein said horizontal rate composite waveform is DC coupled to said product generating means.

4. The circuit of claim 1, further comprising means for generating a horizontal rate sawtooth waveform, a horizontal rate generally sinusoidal waveform and a horizontal rate pulse waveform, coupled to said summing means for forming said composite waveform.

5. A correction circuit for a cathode ray tube displaying images subject to distortion, said circuit comprising:

a horizontal rate generally sinusoidal waveform generator;

a horizontal rate sawtooth waveform generator;

a horizontal rate pulse waveform generator;

means for summing horizontal rate generally sinusoidal, sawtooth and pulse waveforms supplied by said waveform generators to define a horizontal rate composite waveform;

a waveform multiplier for generating as an output signal a product of said horizontal rate composite waveform and a vertical rate waveform;

an amplifier for said output signal; and, a correction coil for said cathode ray tube coupled for receiving said amplified output signal and generating a dynamic magnetic field responsive to said amplified output signal for correcting said distortion.

6. The circuit of claim 5, wherein said horizontal rate composite waveform is DC coupled to said multiplier.

7. The circuit of claim 5, wherein said vertical rate waveform is a sawtooth waveform.

8. The circuit of claim 7, wherein a vertical rate generally sinusoidal waveform is added to said vertical rate sawtooth waveform before said multiplication.

9. The circuit of claim 5, wherein said horizontal rate generally sinusoidal waveform corrects distortion imparted by face plate geometry of said cathode ray tube.

10. The circuit of claim 5, wherein said horizontal rate pulse waveform corrects distortion imparted by operation of said amplifier.

11. The circuit of claim 5, wherein said summing means comprises a resistive summing junction.

12. A correction circuit for a cathode ray tube displaying images subject to distortion, said circuit comprising:

a source of first and second horizontal rate waveforms, said first waveform being a horizontal rate generally sinusoidal waveform;

means for summing said first and second horizontal rate waveforms supplied by said source to define a horizontal rate composite waveform;

a waveform multiplier for generating as an output signal a product of said horizontal rate composite waveform and a vertical rate waveform, said horizontal rate composite signal being DC coupled to said waveform multiplier;

an amplifier for said output signal; and, a correction coil for said cathode ray tube coupled for receiving said amplified output signal and generating a dynamic magnetic field responsive to said output signal for correcting said distortion.

13. The circuit of claim 12, wherein said second horizontal rate waveform is a pulse waveform.

14. The circuit of claim 12, wherein said second horizontal rate waveform is a sawtooth waveform.

15. A correction circuit for a cathode ray tube displaying images subject to distortion, said circuit comprising:

means for generating a horizontal rate sawtooth waveform;

means for generating a horizontal rate generally sinusoidal waveform;

means for summing said horizontal rate sawtooth and generally sinusoidal waveforms to define a horizontal rate composite waveform;

means for generating as an output signal a product of said horizontal rate composite waveform and a vertical rate waveform; and, a correction coil for said cathode ray tube coupled for receiving said output signal and generating a dynamic magnetic field responsive to said output signal for correcting said distortion.

16. The circuit of claim 15, wherein said horizontal rate generally sinusoidal waveform corrects distortion imparted by face plate geometry of said cathode ray tube.

17. The circuit of claim 15, further comprising:

means for amplifying said output signal, coupled to said product generating means and said correction coil; and, means for generating a horizontal rate pulse waveform, said horizontal rate pulse waveform being coupled to said summing means to form another part of said composite horizontal rate waveform, said horizontal rate pulse waveform correcting a distortion imparted by operation of said amplifying means.

18. The circuit of claim 17, wherein said horizontal rate composite waveform is DC coupled to said product generating means.

19. A correction circuit for a cathode ray tube displaying images subject to distortion, said circuit comprising:

means for generating a horizontal rate sawtooth waveform;

means for generating a horizontal rate pulse waveform;

means for generating a horizontal rate generally sinusoidal waveform means for summing said horizontal rate sawtooth, pulse and generally sinusoidal waveforms to define a horizontal rate composite waveform;

means for generating as an output signal a product of said horizontal rate composite waveform and a vertical rate waveform, said horizontal rate composite waveform being DC coupled to said product generating means;

means for amplifying said output signal; and, a correction coil for said cathode ray tube coupled for receiving said amplified output signal and generating a dynamic magnetic field responsive to said output signal, said output signal having a first component for correcting a keystone distortion, a second component for correcting a red/blue left edge curl distortion and a third component for correcting a red/blue sinusoidal distortion.

20. The circuit of claim 19, wherein said keystone distortion is due to off-axis orientation of said cathode ray tube, said red/blue sinusoidal distortion is due to face plate geometry of said cathode ray tube and said red/blue left edge curl distortion is imparted by operation of said amplifying means.

21. A correction circuit for a cathode ray tube displaying images subject to distortion, said circuit comprising:

means for summing three horizontal rate waveforms to define a horizontal rate composite waveform;

means for generating as an output signal a product of said horizontal rate composite waveform and a vertical rate waveform, said horizontal rate composite waveform;

means for amplifying said output signal; and, a correction coil for said cathode ray tube coupled for receiving said amplified output signal and generating a dynamic magnetic field responsive to said output signal, said output signal having a first component for correcting a keystone distortion, a second component for correcting a red/blue generally sinusoidal distortion and a third component for correcting a red/blue edge curl distortion.

22. The circuit of claim 21, wherein said keystone distortion is due to off-axis orientation of said cathode ray tube, said red/blue sine distortion is due to face plate geometry of said cathode ray tube and said red/blue edge curl distortion is imparted by operation of said amplifying means.

23. The circuit of claim 21, wherein said horizontal rate composite waveform is DC coupled to said product generating means.

24. The circuit of claim 21, further comprising means for generating a horizontal rate sawtooth waveform, a horizontal rate generally sinusoidal waveform and a horizontal rate pulse waveform, coupled to said summing means for forming said composite waveform.

* * * * *